(No Model.)
2 Sheets—Sheet 1.
N. B. RAFELSON.
CLOTH CUTTING MACHINE.
No. 250,575.
Patented Dec. 6, 1881.
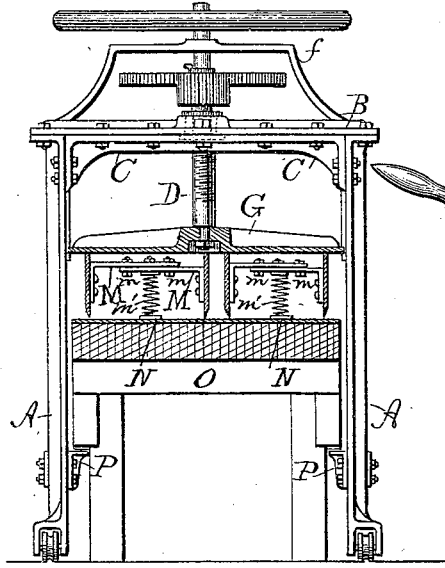
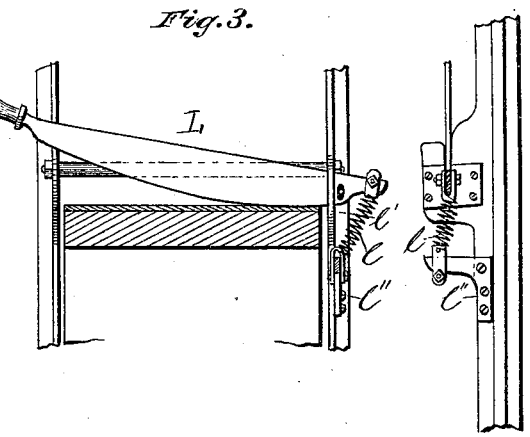
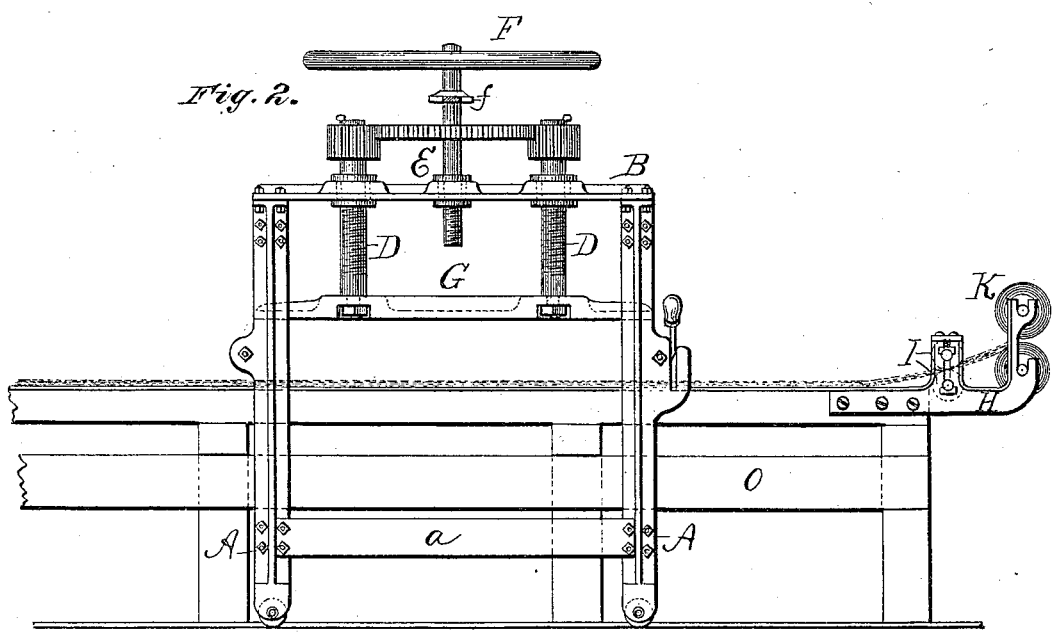
WITNESSES:
INVENTOR:
N. B. Rafelson
BY
ATTORNEYS.

(No Model.) 2 Sheets—Sheet 2.

N. B. RAFELSON.
CLOTH CUTTING MACHINE.

No. 250,575. Patented Dec. 6, 1881.

WITNESSES:
Fred. G. Dietrich
A. G. Syne

INVENTOR:
N. B. Rafelson
BY
ATTORNEYS.

UNITED STATES PATENT OFFICE.

NATHAN B. RAFELSON, OF NEW YORK, N. Y.

CLOTH-CUTTING MACHINE.

SPECIFICATION forming part of Letters Patent No. 250,575, dated December 6, 1881.

Application filed April 28, 1881. (No model.)

*To all whom it may concern:*

Be it known that I, NATHAN B. RAFELSON, a citizen of the United States, residing in New York city, in the county and State of New York, have invented a new and useful Improvement in Machines for Cutting Cloth, of which the following is a full, clear, and exact description, reference being had to the drawings hereto annexed.

The object of my invention is to provide a machine in which the usual expense of time and labor involved in repeatedly feeding the cloth and marking the pattern may be dispensed with.

My invention consists in a press cutter-frame provided with rollers which move upon a track along the sides of a table of any desired length, and a combination of cutting-blades, by which an entire pattern may be cut by a single operation.

My invention further consists in an arrangement of spiral springs for preventing the cloth from being disarranged by the withdrawal of the knives, and in other minor features hereinafter described.

Figure 5:
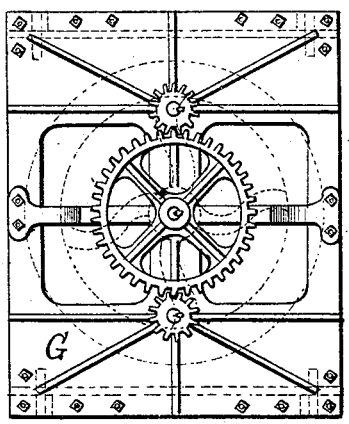
Figure 7:
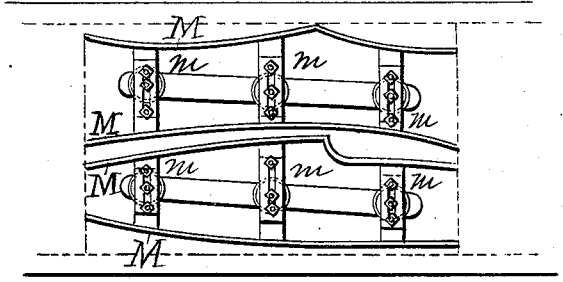
Figure 6:
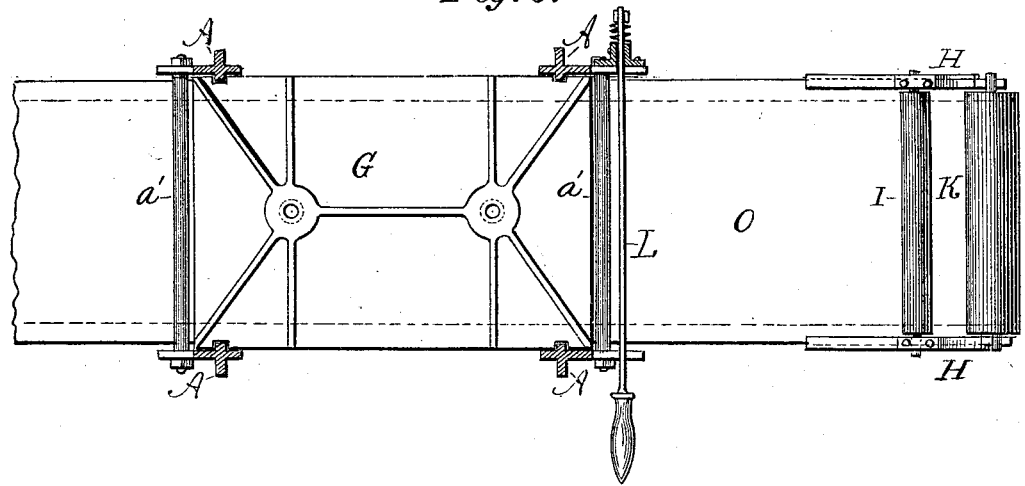

In the accompanying drawings, Figure 1 is an end view and cross-section of the machine and table; Fig. 2, a side elevation of the same with cutters detached; Figs. 3 and 4, details of the knife for cutting cloth in lengths; Fig. 5, a top view of the machine; Fig. 6, a top view of press-plate; and Fig. 7, detail of the pattern-cutters.

Similar letters of reference show corresponding parts.

The frame of the machine consists of four legs or pedestals, A, of cast-iron, with rollers at the base to move it at will along iron rails fixed on the floor on each side of the table O. The four legs are securely screwed to the top plate, B, which is strengthened by cross-ribs, and has three hubs for receiving screws which operate the press. The frame is strengthened at each end by angle-webs C, screwed to the legs and the top B, and is further braced by two plates, *a*, lengthwise, and by two cross-bars, *a'*, crosswise, the latter arranged about four inches above the table. The cross-bars have shoulders and are screwed up tight. If desired, they may also be provided with rubber rollers for holding the cloth in position.

The press is operated with two three-inch screws, D, which are held in the hubs of top plate, B, by screw-boxes made of friction metal. Each screw is provided with a cog-wheel six inches in diameter keyed thereto, and they are operated simultaneously and evenly by an intermediate cog-wheel nineteen and one-half inches in diameter, which is secured to a screw, E, set in top plate, B, and held by a bridge, *f*. Screw E is operated by a power hand-wheel, F, for raising and lowering press-plate G by means of screws D, which are secured to said plate in any well-known manner. The press-plate G is also cast-iron, with ribs and hubs, as shown in Fig. 6, and is held in place by means of grooves, in which move corresponding tongues cast on the legs A.

At the forward end of the table O are fastened two brackets, H, which hold a number of rollers, K, on which the supply of cloth is rolled, and also two rollers, I, of rubber, which are pressed together by a spring operating on the axle of the top roller for regulating the feed of cloth.

To cut the cloth in lengths to suit, a knife, L, is attached across one end of the frame by means of a transverse slot in the butt-end thereof, through which a pin passes to hold it securely to the brackets *l'*, which are screwed to the frame A. This slot allows the knife to yield at the end when worked by the handle. To allow the knife to be pressed firmly down to the table at the handle, it is provided at the opposite end with a strong spiral steel spring, *l*, which is secured to a bracket, *l''*, attached to the leg A.

The knives for cutting the pattern consist of two blades, M M, connected by means of three sets of angles, *m m m*, each set having one branch or arm screwed to a blade, and the opposite arm overlapping and secured to a corresponding angle attached to the other blade in the same manner. The said overlapping arms are slotted and provided with clamp-screws for adjusting the blades to any desired size of pattern. These blades may be made of any desired pattern, and combined in any number necessary for the purpose. The cutters thus arranged are placed under the press-plate on the cloth, and by operating the hand-wheel they are forced into the cloth and the patterns cut out. To prevent the cloth so cut out from clinging to the knives as they are withdrawn, spiral springs $m'$ are secured between the arms of angles $m$, and boards N arranged between the knives, so that the said boards will hold the cloth down.

To secure the greatest pressure from the screws, four brackets, P, are screwed onto the legs A on the inside, close to the lower edge of the table O, so that the whole frame, when the screws are operated, is tightened up against the table.

To protect the edge of the knives, and to provide a slightly-yielding bed for the cloth, the table is covered with rubber.

Having thus described my invention, what I claim as new, and desire to secure by Letters Patent, is—

1. A cloth-cutting machine supported upon rollers which are adapted to move along rails upon opposite sides of a table, substantially as shown and described.

2. A cloth-cutting machine having brackets upon the inner side of its legs, in combination with a table placed beneath it, having corresponding shoulders on its sides, substantially as shown and described, whereby the machine may be held down when the pressure of the plate is exerted, as set forth.

3. A cloth-cutting machine having a system of adjustable pattern-knives, in combination with a rubber-covered table and a series of spiral springs, substantially as shown and described, whereby the knives may be protected in cutting, and withdrawn without disarranging the cloth, as set forth.

4. A cloth-cutting machine having knife L, press-plate G, adjustable pattern-knives M, and brackets P, in combination with table O, substantially as shown and described.

5. In a cloth-cutting machine, the pattern-knives M M, connected by the adjustable angles $m\ m\ m$, in combination with the slab N, spiral springs $m'\ m'$, press-plate G, and table O, substantially as shown and described, whereby an entire pattern may be cut at one operation, as set forth.

NATHAN B. RAFELSON.

Witnesses:
SOLON C. KEMON,
A. G. LYNE.